INVENTOR.
GEORGE R. VILA
BY
Jack Rosin
ATTORNEY

INVENTOR.
GEORGE R. VILA
BY Jack Posin
ATTORNEY

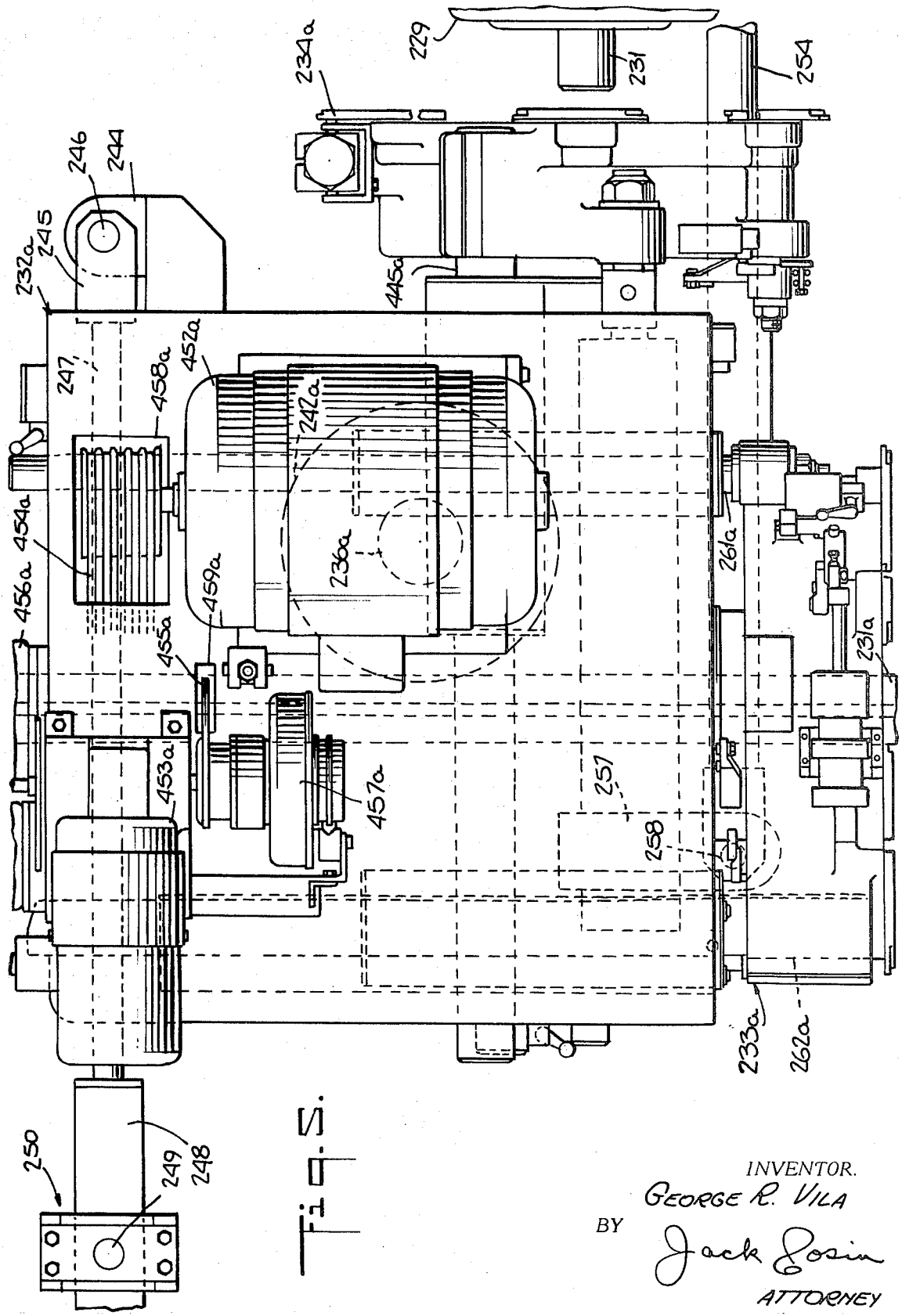

United States Patent Office 3,756,882
Patented Sept. 4, 1973

3,756,882
TIRE BUILDING METHOD
George R. Vila, Far Hills, N.J., assignor to Uniroyal, Inc., New York, N.Y.
Continuation of abandoned application Ser. No. 784,156, Dec. 16, 1968. This application Dec. 8, 1970, Ser. No. 96,288
Int. Cl. B29h 17/00, 17/14
U.S. Cl. 156—111                              10 Claims

ABSTRACT OF THE DISCLOSURE

A method of building tires on an apparatus employing a pair of tire building drum assemblies constructed and arranged to alternately move respective drums between a common first position and separate second positions is disclosed. The method comprises the following: (1) fabricating untreated carcasses on said drums at said common first position; (2) moving alternate drums and alternate of said untreated carcasses fabricated on said drums at said common first position to one of said separate second positions and the remaining ones of said drums and of said untreated carcasses fabricated on said drums at said common first position to the other of said separate second positions; (3) removing said untreated carcasses alternately from said pair of drum assemblies at said separate second positions; and (4) applying treads to said untreated carcasses after removal of said untreated carcasses from said drum assemblies.

---

This application is a continuation of Ser. No. 784,156, filed Dec. 16, 1968, now abandoned.

This invention relates to a method of making pneumatic tires employing two building drums which are movable alternately between a common first, carcass building, station and separate second, carcass removal, stations.

My present invention is an improvement over the invention of the application of Norman T. Kehoe and Elwood A. Stiegler, Ser. No. 336,495, filed Jan. 8, 1964, now U.S. Pat. 3,479,238, and assigned to the assignee of the present invention, which invention was made by said Norman T. Kehoe and Elwood A. Stiegler prior to by invention. I, therefore, do not herein claim anything shown or described in said Kehoe and Stiegler application, which is to be regarded as prior art with respect to this present application.

Said kehoe and Stiegler application discloses a tire building method employing two building drums which are movable alternately between common first positions and separate second positions. According to such application, each building drum is located on a separate pivotally mounted assembly to be movable between a carcass building position common to both drums and a single tread application position, the tread applying positions for the two drums being separate. In such arrangement the carcass building station serves two tread application stations, permitting continuous and efficient production. While one building drum is at the carcass building station, the carcass already produced is provided with a tread at one tread application station and the tread for the drum then at the carcass building station is prepared at the other tread application station.

The present invention is an improvement over the above recited arrangement. According to the present invention a fabricated, untreated carcass is removed from the apparatus when the building drum carrying the carcass is pivoted to its separate second position, and the tread is applied to the carcass at a point remote from the apparatus. It has been found that tire production can be appreciably increased in this manner.

Preferably, the building drum assemblies are arranged on opposite sides of the common carcass building station, have a common pivot drive, and are interconnected so that at any time one building drum is at the first, carcass building station and the other at the second station. Conveniently, the pivoting range of each assembly is 90°.

To facilitate the pivoting of the assemblies, each assembly is mounted so that it is pivotable about a vertical support shaft and is connected to the other assembly by a connecting rod engaging the assembly eccentrically relative to the support shaft, only one assembly being connected to the pivot drive. This pivot drive may be formed by a piston and cylinder unit which is pivotable about a vertical pivot and whose piston rod is articulated on one drive means substantially diametrically opposite the connecting rod. Movement of the piston causes pivoting of the assemblies through 90°.

If an axially movable turn-over cage is associated with each building drum end for applying bead rings and turning over the carcass marginal strips, each assembly preferably has on sides at right angles to each other a building drum with an annular cage held concentric with it, and an independent annular cage for co-operating with the free end of the building drum of the other assembly, so that when the assemblies are simultaneously pivoted, the independent annular cage is brought flush with the free building drum end of the other assembly at the first, carcass building station while the other building drum is at the second station.

For particularly fast carcass building, the building drums of each assembly at the carcass building station are slightly above the end of a belt conveyor which supplies the tire liner and plies, and between the two assemblies there is a belt conveyor applicator which is movable against the associated building drum from below and a toe strip applicator which can be lowered from above.

An example of apparatus according to the invention will now be described in more detail with reference to the accompanying drawings in which:

FIG. 5 is a top view of the other of the building drum assemblies.

Figure 1:
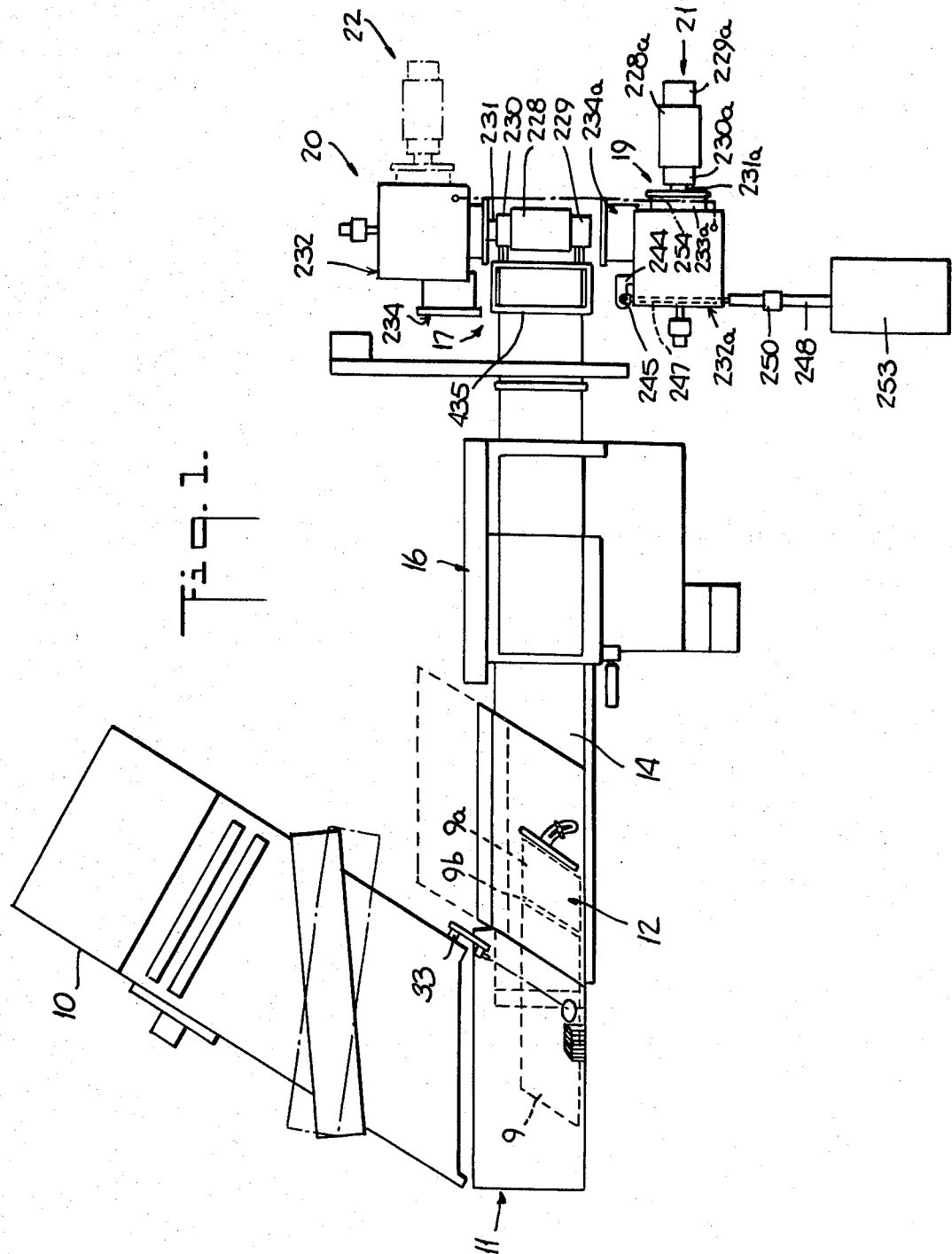
FIG. 1 is a diagrammatic plan view of a semi-automatic tire building apparatus made in accordance with the present invention.

For better comprehension of the invention the general construction of the tire building apparatus will now be described briefly with reference to FIGS. 1 and 2. The apparatus divides into a servicing portion and a building portion. In the servicing portion (on the left in FIG. 1) the tire plies are cut to size on a bias cutter 10, pass to a platform 11, are spliced if necessary (see 9a and 9b) and cut to length on a splicing platform 12, then are aligned on a belt conveyor 14 by means 15 and passed on the belt conveyor to the building end, the conveyor passing through a further servicing unit 16 where it receives liner material.

The servicing unit 16 is followed by the building unit 17 which has on both sides of the end 18 of the belt 14 passing through it a building drum assembly 19, 20. These assemblies are both alternately pivotable between a first carcass building station at the end 18 of the conveyor 14 and a second station 21, 22.

Each building drum assembly 19, 20 comprises a turret 232, 232a, having drive means and having on sides at right angles to each other, on a freely projecting shaft 231, 231a, a building drum 228, 229, 230 or 228a, 229a, 230a with an annular turn-over cage 233, 233a concentric therewith to apply bead rings and turn over the marginal regions of the carcass, or a corresponding solitary annular turn-over cage 234, 234a. For the carcass building step a solitary annular cage 234 or 234a of one turret is associated with the freely projecting end 229 or 229a of the building drum for the other turret for applying bead rings and turning over the carcass marginal portions.

Figure 2:
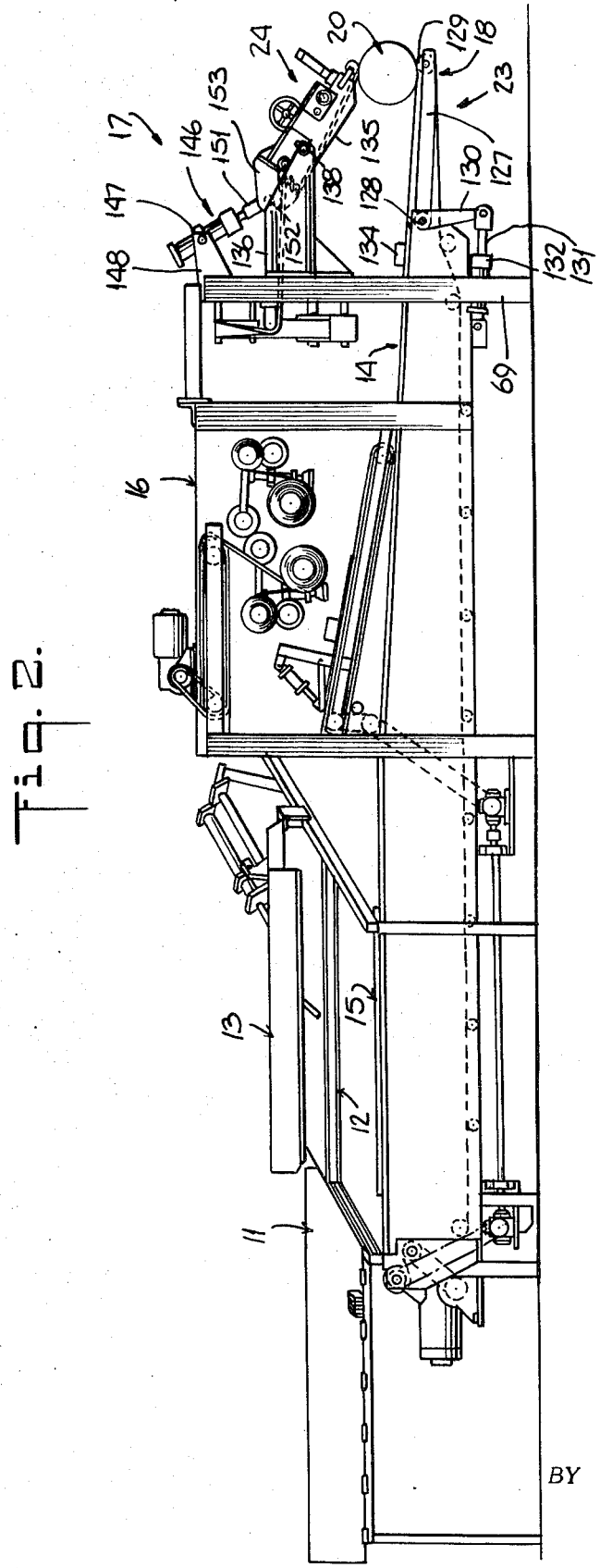
FIG. 2 is an enlarged side elevational view of the structure illustrated in FIG. 1.

To build a carcass for example on the building drum of building drum assembly 20 in FIGS. 1, 2, a lower tire liner and ply applicator 23 and an upper tire strip applicator 24 are provided. The applicator 23 has an elongated rectangular frame 127 which is pivotable on a shaft 128 in the region of the end of the conveyor 14 (FIG. 2). At the front end of this frame 127 there rests a roll 129 around which the conveyor 14 passes. FIG. 2 shows the frame 127 in the position for the application of a liner and carcass plies against the underside of the building drum of assembly 20. From this position the frame can be moved clockwise downwards into an idle position, to which end a lever 130 is provided which is connected at its upper end to the shaft 128 and at its lower end to a piston rod 131 belonging to a compressed-air cylinder 132. This cylinder 132 is hinged onto the frame construction of the apparatus by means of a pin. On the other side of the frame 127 the arrangement is the same.

As shown in FIG. 2, at the end of the conveyor 14 there is an electrostatic device 134 for charging the tire liners and plies to facilitate their application to the building drum. The building drum assemblies 19, 20 are electrically grounded to facilitate the electrostatic attraction between the building drums and the charged plies.

The toe strip applicator 24 has a frame 135 which is open at top and bottom and pivoted at 138 on two opposite sides on support arms 136. These arms 136 are connected to vertical frame members 69 of the apparatus and run horizontally parallel to one another. The frame 135 is brought into the operative position for applying toe strips by means of a pneumatic cylinder 146 pivotably mounted by means of a support member 147 between horizontal, spaced support arms 148, which in turn are connected to the frame construction of the apparatus. The pneumatic cylinder 146 has a downwardly extending pitson rod 151 connected by means of a pivot 152 to laterally spaced support arms 153. FIG. 2 shows the cylinder 146 in a position in which it brings the toe strip applicator 24 into operative contact with the building drum of building drum assembly 20 to apply toe strips. The support arms 153 form a clevis which permits adjustment of the pitson rod 151 relative to the support arms and therefore adjustment of the working stroke of cylinder 146 so that the applicator 24 can be positioned correctly relative to the building drum.

The building drum assemblies 19, 20 are identical in construtcion, and they will now be described substantially with reference to assembly 20 in FIGS. 3 and 4. The corresponding parts in assembly 19 have the same reference numerals followed by the letter a. As already mentioned, the building drum 228, 229, 230 rests on a shaft 231 which is mounted in the turret 232 and can be connected with driving devices provided there. The annular cage 233 for applying bead rings and turning over the carcass marginal regions is mounted on the drive means concentrically with the shaft 231 and is held axially movable relative to the building drum 228–230 on the shaft 231 by means of two guide rods 261, 262. A similar annular cage 234 is guided by means of two guide rods 445, 448 at a place at right angles on the turret. This annular cage co-operates with the end 229a of the building drum of building assembly 19 when the latter is pivoted to the common carcass building station. Similar annular cages 233a and 234a are on the turret 232a in FIG. 5 and the cage 234a co-operates with the end 229 of the building drum of building assembly 20 when the latter is at the carcass building station, as shown in FIG. 1.

The drum assemblies 19 and 20 are constructed and arranged to be pivoted simultaneously between the common first, tire carcass forming, position and the separate second carcass removal positions by means of the following described structure. As shown in FIG. 1, the left assembly 19 is provided with a bracket 244 which is located on the inboard end thereof when the assembly is disposed in the position shown in FIG. 1 and FIG. 5. The bracket 244 is secured fixedly to the underside of the turret 232a towards the rear end thereof. A clevis 245 is connected rotaably to the bracket 244 by means of a hinge pin 246. Threadedly mounted on the inner end of the clevis 245 is an elongated cylinder rod 247 which extends into an hydraulic cylinder 248 in an operative manner. As shown in FIG. 5, the hydraulic cylinder 248 is mounted pivotally by means of a pivot pin 249 in a pivot bracket generally indicated by the numeral 250. As shown in FIG. 4, the pivot bracket 250 includes a lower end wall 251 and an upper end wall 252 in which the lower and upper ends, respectively, of the pivot pin 249 are mounted in a rotatable manner.

The hydraulic cylinder 248 is adapted to be supplied with pressurized hydraulic oil from the conventional pressurized hydraulic oil source generally indicated by numeral 253 in FIG. 1. This hydraulic oil source 253 would include the usual hydraulic oil reservoir and pump for supplying hydraulic oil under pressure to the hydraulic cylinder 248. It will be seen that when the hydraulic cylinder 248 is operated to move the cylinder rod 247 into the cylinder 248, or to the left as viewed in FIG. 5, the turret 232a will be rotated about its vertical support shaft 236a in a counterclockwise direction as viewed in plan to pivot the outboard turnover cage 234a into the inoperative position, and the drum assembly 19 into the common tire carcass forming position. When the hydraulic cylinder 248 is operated in a reverse direction, so as to move the cylinder rod 247 out of the cylinder 248, the turret 232a will be returned to the position shown in FIG. 5.

The turrets 232 and 232a are interconnected by the following described structures so that the two turrets will rotate simultaneously. The turrets 232 and 232a are interconnected by means of the elongated shaft 254 which is shown in FIGS. 3, 4 and 5, and which is disposed beneath the front ends of the turrets. As shown in FIGS. 3 and 4, the right end of the shaft 254 is connected to a bracket 255 by means of a hinge pin 256. The left end of the shaft 254 is connected to a similar bracket 257 (FIG. 5) which is mounted fixedly on the lower side of the turret 232a. The shaft 254 is connected to the bracket 257 by means of a hinge pin 258 (FIG. 5).

It will be seen that when the turrets 232 and 232a are disposed in the position shown in FIG. 1 the bracket 257 is disposed perpendicular to the shaft 254 and the bracket 255 is disposed in alignment with the shaft 254. In the last mentioned position the bracket 255 is adapted to abut an adjustable stop bar 259 which is mounted adjustably on a bracket 260 formed integral with the turret pivot shaft base 243. It will be seen that when the hydraulic cylinder rod 247 is moved to the left into the cylinder 248, as viewed in FIG. 5, the turret 232a will be rotated counterclockwise about the shaft 236a and the shaft 254 will function to rotate simultaneously the turret 232 about its vertical support shaft 236 in a counterclockwise direction. The drum assembly 20 thus will be moved from the common tire carcass building position to its separate second position 22. Simultaneously, the drum assembly 19 is rotated from its respective separate second position 21 to the common tire carcass building position. The reverse action occurs when the cylinder rod 247 again is moved out of the cylinder 248. It will be understood, that the cylinder 248 oscillates about the vertical hinge pin 249 during a turret rotating operation.

Figure 3:
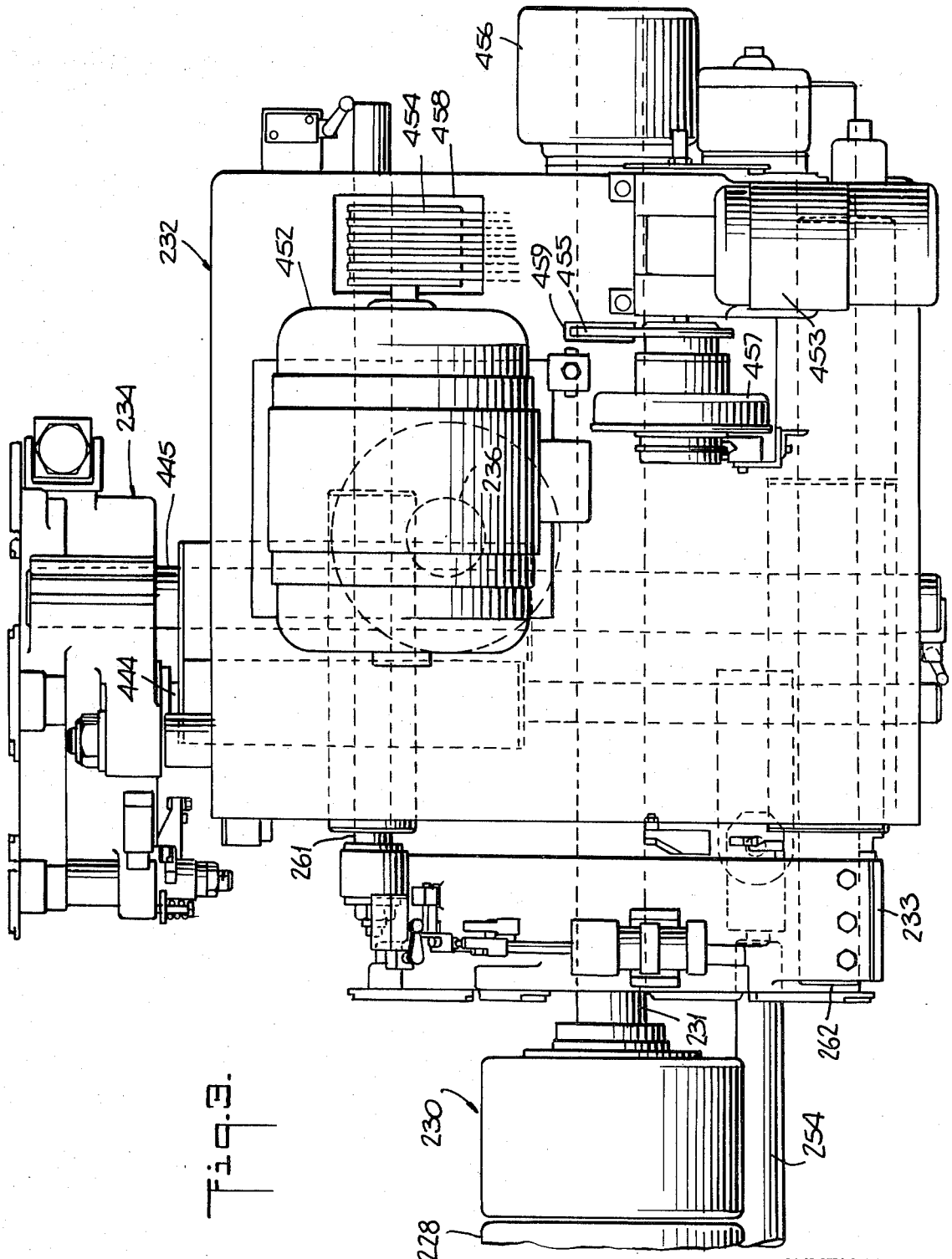
FIG. 3 is a top view of one of the building drum assemblies.
Figure 4:
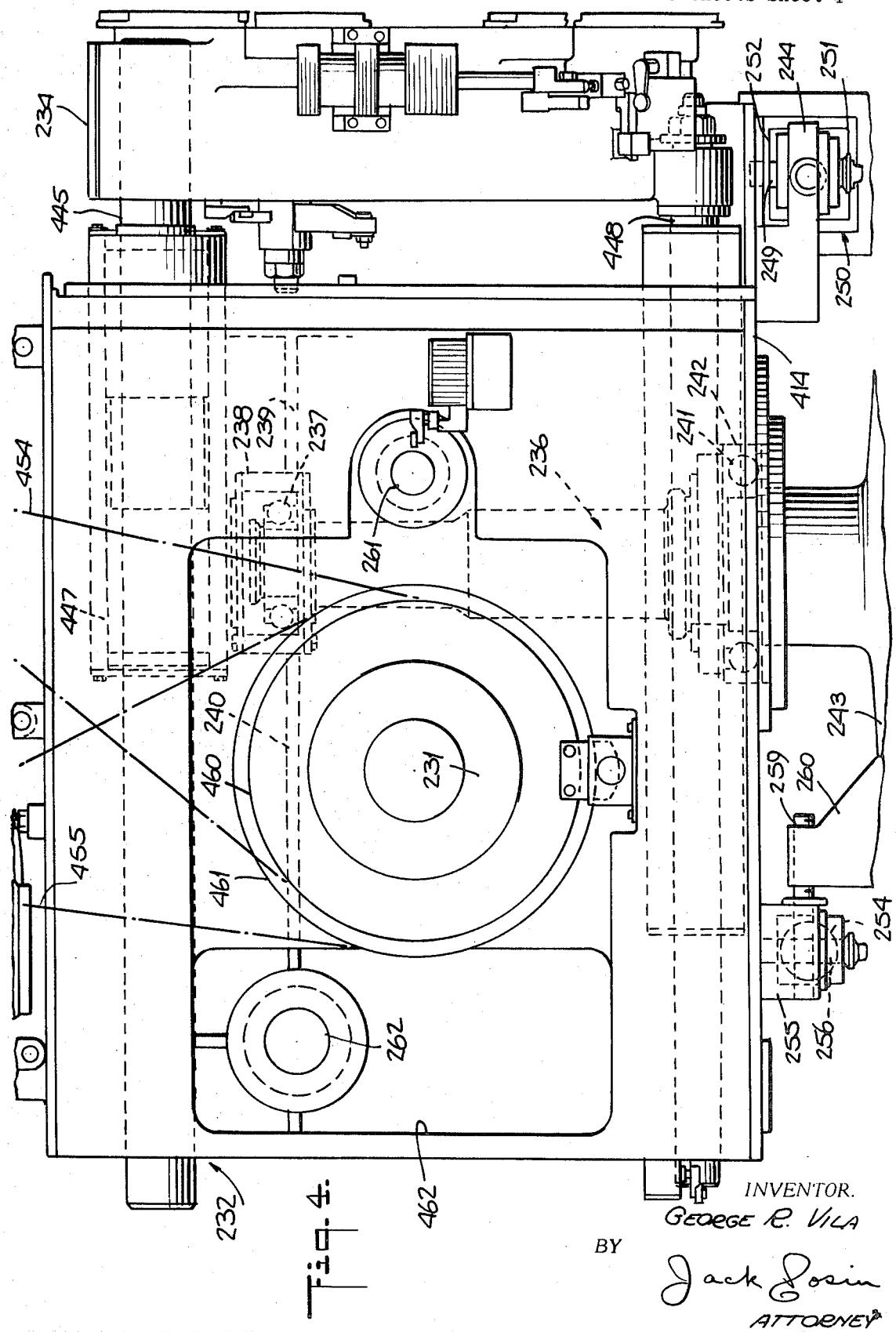
FIG. 4 is a right end elevational view of the structure illustrated in FIG. 3.

As shown in FIG. 3, the drum assembly shaft 231 is rotated selectively by electric motors 452 or 453. The electric motor 452 is supported on the top of the turret 232 in a suitable manner and is connected operatively to the shaft 231 by a plurality of drive belts 454. The motor 452 rotates the drum assembly 20 at a speed of approximately 280 r.p.m. during the application of the liner and ply material to the drum assembly. The electric motor 453 is connected operatively to the shaft 231 by a drive belt 455 and drives the drum assembly 20, at a speed of approximately 12 r.p.m. during the application of the toe strips to the drum assembly. The motors 452 and 453 are adapted to be connected selectively to the shaft 231 in the proper timed sequence by any suitable clutch means, as for example, the clutch mechanisms generally indicated by the numerals 456 and 457, respectively.

The motor drive belts 454 and 455 extend down through suitable holes 458 and 459 formed in the top wall of the turret 232, and are mounted around pulleys 460 and 461, respectively. The pulleys 460 and 461 are seen in FIG. 4 through an opening 462 formed in the rear end of the turret 232.

The building unit 17 of the apparatus operates as follows. It is assumed that the operator for the building unit 17 has previously applied annular bead rings to the annular cages 233 and 234a. The operator then works a control button (not shown) to bring the building drum assemblies 19, 20 into the positions shown in FIG. 1. This adjustment is effected by the device already mentioned which moves the turrets 232, 232a between their two positions, which device includes the hydraulic cylinder 248, piston rod 247 and connecting rod 254. The positioning of the two building drum assemblies 19, 20 starts automatic building of the tire carcass. First the associated building drum 228, 229, 230 is set in rotation by the electric motor 453. Then the toe strip applicator 24 is lowered until it touches the building drum, to apply a pair of spaced toe strips to the building drum in the region of the annular bead portions. After application of the toe strips, the applicator 24 rises, and the liner and ply applicator 23 is raised automatically until it touches the lower surface of the building drum, to apply a liner and a pair of carcass plies over the toe strips. During the liner and carcass ply application, the drum 228, 229, 230 is rotated by the motor 452 at a speed higher than that provided by the motor 453 during the toe strip application. The pressure applied by the liner and ply applicator 23 is sufficient to stitch the tire components together as they are applied to the drum 228, 229, 230. When the liner and ply application is completed, the applicator 23 is lowered and the drum 228, 229, 230 stops in a predetermined position. The turn-over cages 233 and 234a are then moved axially inwardly and the ends of the plies are tuned over to locate a bead wire at each end of the carcass.

It will be understood that the tire components for a subsequent tire carcass are being prepared by an operator at the service end portion of the tire building apparatus adjacent bias cutter 10 during the aforedescribed automatic tire carcass fabrication. After the turnover cages 233 and 234a have returned to the positions shown in FIG. 1, the tire building apparatus is ready then for indexing the drum assembly 19 into the common tire carcass building position. The operator at the building unit 17 end portion of the apparatus then indexes the apparatus so that the drum of drum assembly 20 is positioned at the separate second station 22, as shown in broken lines in FIG. 1. Simultaneously the drum of drum assembly 19 is indexed from the separate second station 21 to the common tire carcass building position previously occupied by the drum of assembly 20 and a second tire carcass is fabricated automatically on the drum of assembly 19.

The drum 228, 229, 230, in the separate second position 22, may have the fabricated carcass removed from it and passed to one or another of one or more further stations remote from the carcass building apparatus for tread application while the drum remains on the drum assembly 20. Alternatively, the drum 228, 229, 230, if made detachable from drum assembly 20, may be removed from the turret 232 along with the fabricated carcass thereon and may be replaced by another, empty drum, the drum 228, 229, 230 and fabricated carcass then being passed to the further station. At such further station the carcass is rechucked, if removed from the drum 228, 229, 230, or the drum 228, 229, 230 is remounted, and tire tread is applied to the fabricated carcass by any known method.

While a particular embodiment of this invention has been shown and described, it will be obvious to those skilled in the art that various changes and modifications may be made without departing from this invention in its broader aspects, and it is, therefore, aimed in the appended claims to cover all such changes and modifications as fall within the true spirit and scope of this invention.

I claim:

1. A method of building tires on an apparatus employing first and second tire building drum essemblies constructed and arranged to alternately move corresponding drums between a common first position and separate second positions, comprising: fabricating a first untreaded carcass on a bare drum at said common first position; operating said first drum assembly to move said first-named drum with said first untreaded carcass to one of said separate second positions; operating said second drum assembly to move another bare drum to said common first position; removing said first untreaded carcass from said first drum assembly while said first untreaded carcass is at said one of said separate second positions; fabricating a second untreaded carcass on said second-named drum at said common first position; said step of removing said first untreaded carcass from said first drum assembly taking place during, and prior to completion of, said fabrication of said second untreaded carcass; operating said second drum assembly to move said second-named drum with said second untreaded carcass to the other of said separate second positions; operating said first drum assembly to move an empty drum to said common first position; removing said second untreaded carcass from said second drum assembly while said second untreaded carcass is at said other of said separate second positions; fabricating a third untreaded carcass on said third-named drum at said common first position, said step of removing said second untreaded carcass from said second drum assembly taking place during, and prior to completion of, said fabrication of said third untreaded carcass; continuously repeating the aforesaid operations; transporting said untreaded carcasses to at least one station remote from said apparatus after removal thereof from said drum assemblies and applying treads to said untreaded carcasses at at least said one station, whereby there is effected the substantially continuous fabrication of untreaded carcasses at said common first position in the absence of delays which would otherwise result from applying treads to respective ones of said untreaded carcasses at their respective separate second positions.

2. A method of building tires as described in claim 1, wherein, during the respective removals of said untreaded carcasses from said drum assemblies, the drums on which said carcasses are fabricated are removed from said drum assemblies together with said carcasses and are transported together with said carcasses thereon to said one station remote from said apparatus after removal thereof from said drum assemblies.

3. A method of building tires as described in claim 2 further comprising remounting the drums with the carcasses thereon at at least said one remote station preparatory to applying respective treads to the carcasses thereon.

4. A method of building tires as described in claim 3 further comprising mounting additional empty drums, respectively, on said drum assemblies to replace the carcass carrying drum removed therefrom.

5. A method of building tires as described in claim 1, wherein, during the respective removals of said untreaded carcasses from said drum assemblies, said carcasses are removed from the drums on which said carcasses are fabricated while said drums remain with said drum assemblies.

6. A method of building tires as described in claim 5 further comprising rechucking the carcasses on additional drums respectively at at least said one remote station preparatory to applying the treads thereto.

7. A method of building tires on an apparatus employing first and second tire building drum assemblies constructed and arranged to alternately move corresponding drums between a common first position and separate second positions, comprising: fabricating a first untreaded carcass on a bare drum at said common first position; operating said first drum assembly to move said first-named drum with said first untreaded carcass to one of said separate second positions, and concurrently operating said second drum assembly to move another bare drum to said common first position; removing said first untreaded carcass from said first drum assembly while said first untreaded carcass is at said one of said separate second positions and while said second-named drum is at said common first position, and fabricating a second untreaded carcass on said second-named drum at said common first position, said step of removing said first untreaded carcass taking place during, and prior to completion of, the fabrication of said second untreaded carcass; operating said second drum assembly to move said second-named drum with said second untreaded carcass to the other of said separate second positions, and concurrently operating said first drum assembly to move an empty drum to said common first position; removing said second untreaded carcass from said second drum assembly while said second untreaded carcass is at said other of said separate second positions and while said third-named drum is in said common first position, and fabricating a third untreaded carcass on said third-named drum at said common first position, said step of removing said second untreaded carcass taking place during, and prior to completion of, the fabrication of said third untreaded carcass; continuously repeating the aforesaid operations in sequence; transporting said untreaded carcasses to at least one station remote from said apparatus after removal thereof from said drum assemblies and applying treads to said untreaded carcasses at at least said one station, whereby there is effected the substantially continuous fabrication of untreaded carcasses at said common first position in the absence of delays which would otherwise result from applying treads to respective ones of said untreaded carcasses at their respective separate second positions.

8. A method of building tires as described in claim 7, wherein, during the respective removals of said untreaded carcasses from said drum assemblies, the drums on which said carcasses are fabricated are removed from said drum assemblies together with said carcasses and are transported together with said carcasses thereon to said one station remote from said apparatus after removal thereof from said drum assemblies.

9. A method of building tires as described in claim 7, wherein, during the respective removals of said untreaded carcasses from said drum assemblies, said carcasses are removed from the drums on which said carcasses are fabricated while said drums remain with said drum assemblies.

10. A method of building tires as described in claim 9 further comprising rechucking the carcasses on additional drums respectively at at least said one remote station preparatory to applying treads thereto.

References Cited

UNITED STATES PATENTS

| | | | |
|---|---|---|---|
| 3,479,238 | 11/1969 | Kehoe et al. | 156—111 |
| 3,532,577 | 10/1970 | Niclas et al. | 156—396 X |
| 3,607,555 | 9/1971 | Leblond et al. | 156—396 |
| 3,306,804 | 2/1967 | Black et al. | 156—111 X |
| 2,818,907 | 1/1958 | Sapp | 156—396 |
| 1,334,185 | 3/1920 | Stevens | 156—396 X |
| 1,536,459 | 5/1925 | Stevens | 156—396 X |
| 2,208,324 | 7/1940 | Haase | 156—396 |
| 3,223,573 | 12/1965 | Deist | 156—111 X |
| 941,962 | 11/1909 | State | 156—396 X |
| 1,159,840 | 11/1915 | Hermann | 156—396 X |

RALPH S. KENDALL, Primary Examiner

C. B. COSBY, Assistant Examiner

U.S. Cl. X.R.

156—123, 128, 133, 396, 405

PO-1050
(5/69)

UNITED STATES PATENT OFFICE
CERTIFICATE OF CORRECTION

Patent No. 3,756,882                     Dated Sept. 4, 1973

Inventor(s)  GEORGE R. VILLA

It is certified that error appears in the above-identified patent and that said Letters Patent are hereby corrected as shown below:

Column 1, line 18, change "untreated" to --untreaded--;
         line 23, change "untreated" to --untreaded--;
         line 44, change "by" to --my--; and
         line 49, change "kehoe" to --Kehoe--.

Column 3, line 45, change "pitson" to --piston--;
         line 51, change "pitson" to --piston--; and
         line 56, change "construtcion" to --construction--.

Column 4, line 13, change "taably" to --tatably--.

Column 6, line 24, change "essemblies" to --assemblies--.

Column 7, line 4, change "drum" to --drums--.

Signed and sealed this 18th day of June 1974.

(SEAL)
Attest:

EDWARD M. FLETCHER, JR.
Attesting Officer

C. MARSHALL DANN
Commissioner of Patents